(12) United States Patent
Kim et al.

(10) Patent No.: US 7,316,873 B2
(45) Date of Patent: Jan. 8, 2008

(54) METHOD OF MANUFACTURING COLOR FILTER SUBSTRATE OF LIQUID CRYSTAL DISPLAY DEVICE

(75) Inventors: Jeong Hyun Kim, Gunpo-si (KR); Sam Yeoul Kim, Osan-si (KR)

(73) Assignee: LG.Philips LCD Co., Ltd, Seoul (KR)

( * ) Notice: Subject to any disclaimer, the term of this patent is extended or adjusted under 35 U.S.C. 154(b) by 0 days.

(21) Appl. No.: 11/543,918

(22) Filed: Oct. 6, 2006

(65) Prior Publication Data

US 2007/0122722 A1    May 31, 2007

(30) Foreign Application Priority Data

Nov. 29, 2005    (KR) ...................... 10-2005-0114812

(51) Int. Cl.
*G02B 5/20* (2006.01)
*G02F 1/1335* (2006.01)

(52) U.S. Cl. .......................................... 430/7; 430/200

(58) Field of Classification Search ................ None
See application file for complete search history.

(56) References Cited

U.S. PATENT DOCUMENTS

| 5,166,126 | A * | 11/1992 | Harrison et al. ............ 503/227 |
| 6,242,140 | B1 * | 6/2001 | Kwon et al. .................... 430/7 |
| 2001/0010884 | A1 * | 8/2001 | Guehler et al. ................ 430/7 |

* cited by examiner

*Primary Examiner*—John A. McPherson
(74) *Attorney, Agent, or Firm*—McKenna Long & Aldridge LLP

(57) ABSTRACT

A method of manufacturing color filter substrate of an LCD device is disclosed. The method includes forming black matrix layers on a substrate except in pixel regions, positioning a printing film above the substrate, the printing film including a color filter printing layer, an overcoat layer, and a transforming layer, and patterning a corresponding color filter layer and a corresponding overcoat layer in each of the pixel regions by applying light to the printing film in a region corresponding to any one of the pixel regions.

20 Claims, 3 Drawing Sheets

METHOD OF MANUFACTURING COLOR FILTER SUBSTRATE OF LIQUID CRYSTAL DISPLAY DEVICE

This application claims the benefit of Korean Patent Application No. 10-2005-114812, filed on Nov. 29, 2005, which is hereby incorporated by reference for all purposes as if fully set forth herein.

BACKGROUND OF THE INVENTION

1. Field of the Invention

The present invention relates to a liquid crystal display (LCD) device, and more particularly, to a method of manufacturing a color filter substrate of an LCD device.

2. Discussion of the Related Art

Currently, various display devices are in high demand. Accordingly, many efforts have been made to research and develop various flat display devices such as liquid crystal display (LCD), plasma display panel (PDP), electroluminescent display (ELD), and vacuum fluorescent display (VFD). Some of the types of flat display devices have already been included in displays for various types of equipment.

Among the various flat display devices, liquid crystal display (LCD) devices have been most widely used due to their advantageous characteristics. For example, LCD devices have a thin profile, are lightweight, and consume a low amount of power. Accordingly, an LCD device is a substitute for a Cathode Ray Tube (CRT). In addition to LCD devices used in mobile equipment, such as displays for notebook computers, LCD devices have been developed for computer monitors and televisions to receive and display broadcasting signals.

An LCD device typically includes an LCD panel that displays images and a driver that applies a driving signal to the LCD panel. The LCD panel may include first and second glass substrates bonded together at a predetermined interval and a liquid crystal layer formed between the first and second substrates.

The first glass substrate, for example a TFT array substrate, may include a plurality of gate lines, a plurality of data lines, a plurality of pixel electrodes, and a plurality of thin film transistors. The plurality of gate lines are formed at fixed intervals in a first direction, and the plurality of data lines are formed at fixed intervals in a second direction substantially perpendicular to the first direction, to thereby define a plurality of pixel regions. Then, the plurality of pixel electrodes, which are arranged in a matrix, are respectively formed in the pixel regions. The plurality of thin film transistors are switched according to signals on the gate lines so as to transmit signals on the data lines to the respective pixel electrodes.

The second glass substrate, for example, a color filter substrate, may include a black matrix layer that excludes light from regions except the pixel regions of the first glass substrate, R(red)/G(green)/B(blue) color filter layers displaying various colors, and a common electrode to represent the picture image.

Also, spacers may be provided between the first and second glass substrates. Then, the two glass substrates may be bonded to each other by a sealant. Subsequently, liquid crystal may be injected into a space between the first and second glass substrates, to thereby form the liquid crystal layer.

The color filter layer produces various colors in the image. The color filter layer includes three-color filters that transmit predetermined wavelengths of light.

Each pixel region corresponds to a first dot that displays color and is divided into three sub pixels. In this state, red (R), green (G), and blue (B) color filters are arranged in the respective sub pixels, to thereby realize full-color images.

The color filter layer may be manufactured by various methods. The methods include, for example, a pigment-spraying method, a printing method, an electro-deposition method, and a thermal-printing method. The pigment-spraying method has an excellent color realization ratio, but requires long and complicated processing. The printing method requires a simpler process, but cannot be applied to a large-sized display device because the printing method is not very elaborate. The electro-deposition method may produce flat color filter layers having color filters that do not vary in thickness. However, the electro-deposition method may produce poor picture quality.

The thermal-printing method may be a dry-etching process. In the thermal-printing method, a printing film including a color material is formed on a substrate, and then a light source, such as laser beam, is applied to the substrate, whereby the color material of the printing film is transcribed to the substrate. The printing film may be a red (R), green (G), or blue (B) printing film.

A related art thermal-printing method for manufacturing a color filter substrate of an LCD device is explained as follows.

As shown in FIG. 1A, black matrix patterns 12 are formed on predetermined portions of a substrate 10. Then, a printing film 14, which is used to form a first color filter layer, is positioned at a predetermined interval from the substrate 10 including the black matrix patterns 12. The printing film 14 may include a supporting layer 14a, a transforming layer 14b that transforms light energy into heat energy, and a first color printing layer 14c. The printing film 14 may be tightly adhered to the substrate 10 by vacuum.

As light is applied by a light source to the supporting layer 14a of the printing film 14, the transforming layer 14b absorbs the light and emits heat. The first color printing layer 14c is thereby transcribed to the substrate 10 due to the emitted heat. A first color filter layer 16a is thus formed on the substrate 10.

The light source may include a laser head, wherein a laser beam is emitted from the laser head.

As shown in FIG. 1B, the above process is repetitively performed using second and third color printing layers (not shown), to thereby form second and third color filter layers 16b and 16c. Then, the color filter layers 16a, 16b and 16c may be cured at a temperature between 200° C. and 300° C.

As shown in FIG. 1C, after completing the curing process, an overcoat layer 18 may be formed on the substrate 10. Then, a common electrode layer 20 may be formed on the overcoat layer 18 by sputtering or E-beam.

The overcoat layer 18 is formed on a display area inside a sealant on the substrate. The overcoat layer 18 is not formed in a non-display area. The overcoat layer 18 is formed by coating an organic insulating material on an entire surface of the substrate 10 and patterning the coated organic insulating material by photolithography. The photolithography required for forming the overcoat layer 18 is necessarily complicated. Thus, manufacturing costs are increased.

SUMMARY OF THE INVENTION

Accordingly, the present invention is directed to a method of manufacturing a color filter substrate of a liquid crystal display (LCD) device that substantially obviates one or more problems due to limitations and disadvantages of the related art.

An advantage of the present invention is to provide a method of manufacturing a color filter substrate of an LCD device such that the process is simplified.

Additional features and advantages of the invention will be set forth in the description which follows, and in part will be apparent from the description, or may be learned by practice of the invention. These and other advantages of the invention will be realized and attained by the method particularly pointed out in the written description and claims hereof as well as the appended drawings.

To achieve these and other advantages and in accordance with the purpose of the invention, as embodied and broadly described, a method of manufacturing a color filter substrate of an LCD device includes forming black matrix layers at fixed intervals on a substrate except in first, second and third pixel regions; positioning a first printing film above the substrate, the first printing film including a first color filter printing layer, an overcoat layer, and a transforming layer; and forming a first color filter layer and a first overcoat layer in the first pixel region by applying light to the first printing film in a region corresponding to the first pixel region.

In another aspect of the present invention, a method of manufacturing a color filter substrate of an LCD device includes forming black matrix layers on a substrate except in pixel regions; positioning a printing film above the substrate, the printing film including a color filter printing layer, an overcoat layer, and a transforming layer; and patterning a corresponding color filter layer and a corresponding overcoat layer in each of the pixel regions by applying light to the printing film in a region corresponding to any one of the pixel regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE INVENTION

Reference will now be made in detail to exemplary embodiments of the present invention, examples of which are illustrated in the accompanying drawings. Wherever possible, the same reference numbers will be used throughout the drawings to refer to the same or similar parts.

A method of manufacturing a color filter substrate of a liquid crystal display (LCD) device according to the present invention will be explained with reference to the accompanying drawings.

FIGS. 2 to 5 are cross sectional views that illustrate a method of manufacturing a color filter substrate of an LCD device according to the present invention.

Figure 1A:
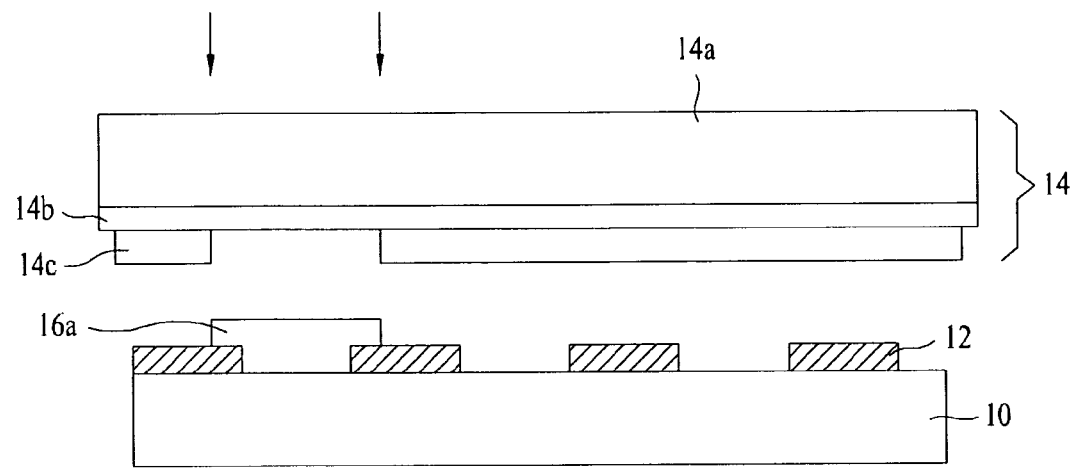
FIGS. 1A, 1B and 1C are cross sectional views that illustrate a method of manufacturing a color filter substrate of an LCD device according to the related art.
Figure 1B:
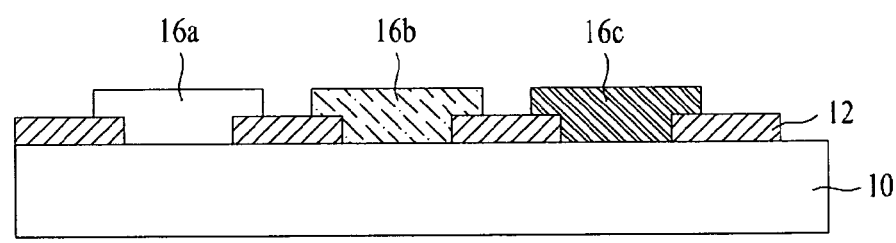
Figure 1C:
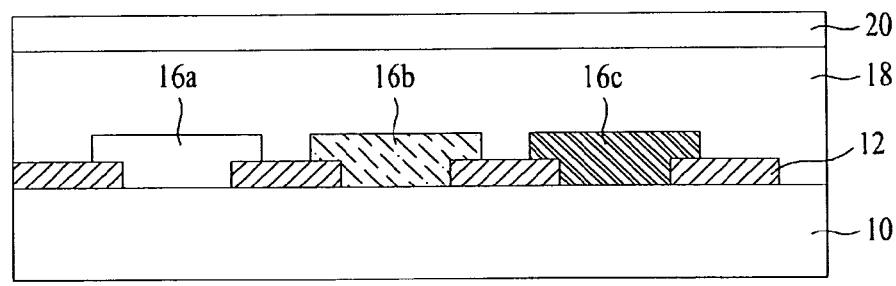
Figure 2:
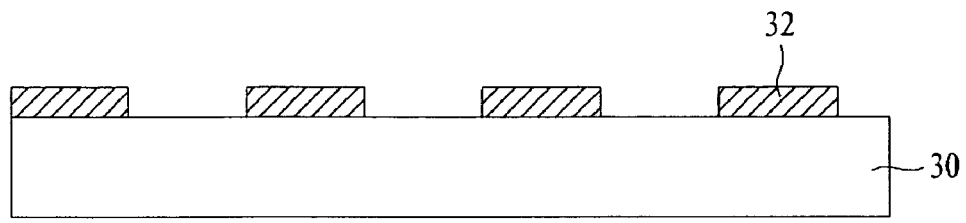
FIGS. 2, 3, 4 and 5 are cross sectional views that illustrate a method of manufacturing a color filter substrate of an LCD device according to the present invention.

As shown in FIG. 2, a black matrix layer 32, which may include multiple layers, is formed on predetermined portions of a substrate 30.

The black matrix layer 32 may be formed by the following method.

First, a cleaning process is performed on the substrate 30. Then, a black matrix material, for example, a chrome-based inorganic material or a carbon-based organic material may be deposited on an entire surface of the cleaned substrate 30 by sputtering. Subsequently, a photoresist (not shown) is coated on the substrate 30 on which the black matrix material has been coated. Then, a mask (not shown) having a predetermined pattern is positioned above the substrate 30 coated with the photoresist. Ultraviolet (UV) rays are then applied to the substrate 30 through the mask. The portions of the photoresist and the black matrix material that are irradiated with the UV rays, based on the predetermined pattern of the mask, are removed. According to the predetermined pattern of the mask, the black matrix layers 32 are formed at fixed intervals on the substrate 30.

Figure 3:
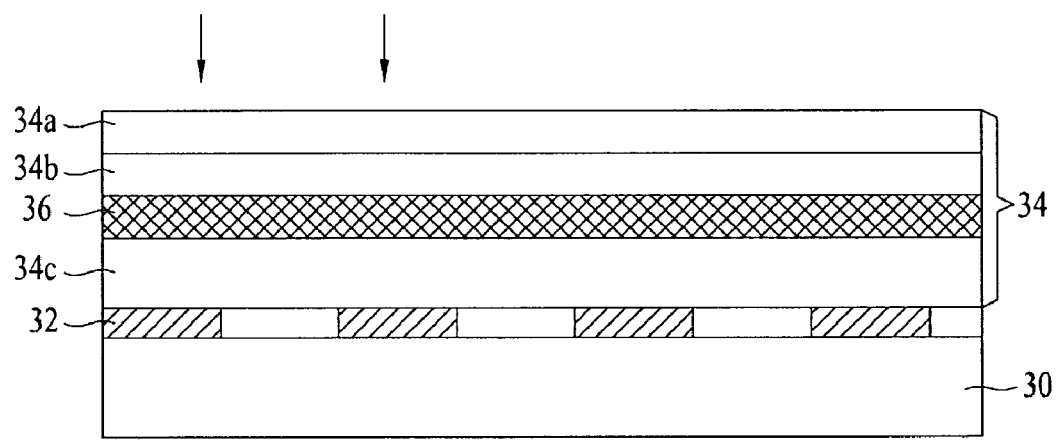

Referring to FIG. 3, a first printing film 34 is positioned opposing the substrate 30 including the black matrix layer 32. The first printing film 34 includes a supporting layer 34a, a transforming layer 34b, an overcoat layer 36, and a printing layer 34c. The first printing film 34 may be formed in a multi-layered structure by a roll-to-roll method. To form the first printing film 34, one layer is coated and dried, and then another layer is coated on the dried layer, and is itself dried.

The supporting layer 34a supports the first printing film 34. The supporting layer 34a may be formed of a polymer having good transparency, such as, for example, polyester, polyacrylate, epoxy resin, polyethylene, polypropylene, or polystyrene.

The transforming layer 34b absorbs the laser beam, and transforms the light energy of the laser beam to heat energy. The transforming layer 34b may be formed of a material that absorbs ultraviolet light and infrared rays, and that transforms light energy to heat energy. Such a material may be, for example, an organic compound of carbon black, carbon-graphitic pigment, or IR-pigment; a metal material of aluminum (Al), tin (Sn), or titanium (Ti); or an oxide of the above metal material.

The printing layer 34c is formed of a color material that is transcribed to the substrate 30 by heat energy transformed in the transforming layer 34b. Color materials may be red (R), green (G), and blue (B). The printing layer 34c of the first printing film 34 is provided to form a color filter having red (R) color.

The overcoat layer 36 may be formed of an acrylic-based material including components that enhance the printing property.

Figure 4:
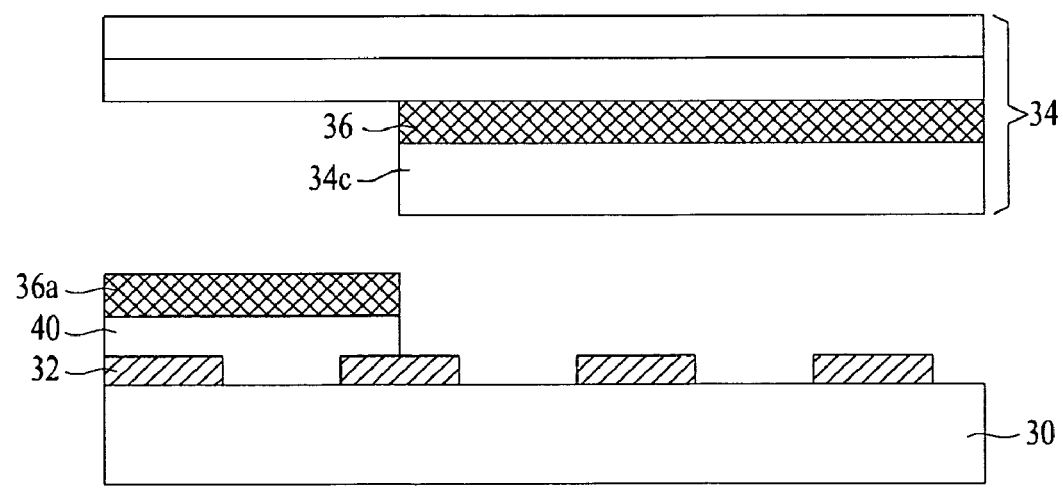

As the laser beam emitted from the laser head is applied to predetermined portions of the first printing film 34, the laser beam is absorbed into the predetermined portions of the transforming layer 34b through the supporting layer 34a. The transforming layer 34b transforms light energy from the laser beam to heat energy. Then, the heat energy is transmitted to the predetermined portions of the overcoat layer 36 and the printing layer 34c. Accordingly, the predetermined portions of the overcoat layer 36 are separated from the transforming layer 34b, and the color material of the predetermined portions of the printing layer 34c is transcribed to the substrate 30, as shown in FIG. 4.

The heat energy is transmitted to the overcoat layer 36 as well as the printing layer 34c. At this time, predetermined portions of the overcoat layer 36 and the printing layer 34c, to which the laser beam is applied, are left on the substrate 30. The first overcoat layer 36a is a passivation layer for the first color filter layer 40. Then, the other portions of the first printing film 34 including the overcoat layer 36, to which the laser beam is not applied, are removed completely.

Figure 5:
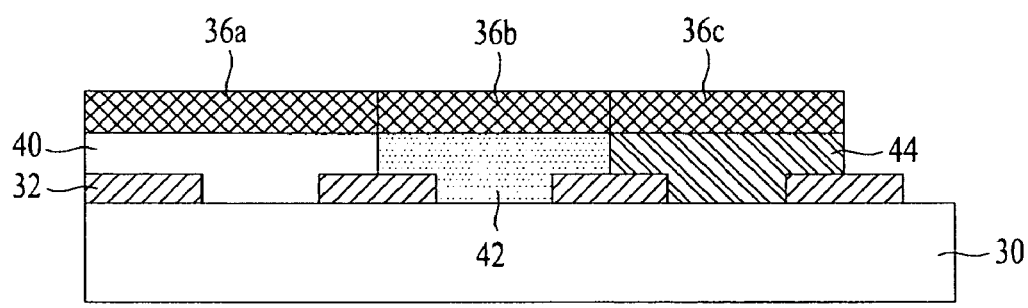

Next, as shown in FIG. 5, the process for each of the second and third printing films is repetitively performed to the substrate 30, to thereby form the color filter layers having the colors green (G) and blue (B). At this time, the second and third overcoat layers 36b and 36c are respectively formed on the color filter layers 42 and 44, having green (G) and blue (B) colors respectively.

After removing the first printing film 34, the second printing film (not shown) is formed on the substrate 30 including the first color filter layer 40, and the above process is again performed. Thus, the second color filter layer 42 having green (G) color is formed on the substrate 30 including the first color filter layer 40.

Like the first printing film 34, the second printing film may also include a supporting layer, a transforming layer, an overcoat layer, and a printing layer. The printing layer of the second printing film may be provided to form a color filter layer having green (G) color. Also, the second overcoat layer 36b is formed on the second color filter layer 42.

After removing the second printing film (not shown) from the substrate 30 including the first and second color filter layers 40 and 42, the third printing film (not shown) is formed on the substrate 30 including the first and second color filter layers 40 and 42. The above process is again performed, to thereby form the third color filter layer 44. As shown in FIG. 5, the color filter layers 40, 42 and 44 having red (R), green (G) and blue (B) colors are formed on the substrate 30.

Like the first printing film, the third printing film may include a supporting layer, a transforming layer, an overcoat layer, and a printing layer. The printing layer of the third printing film may be provided to form a color filter layer having a blue (B) color. Also, the third overcoat layer 36c is formed on the third color filter layer 44.

The first, second and third overcoat layers 36a, 36b and 36c are passivation layers for the respective first, second and third color filter layers 40, 42 and 44. The first, second and third overcoat layers 36a, 36b and 36c are positioned on the substrate of a display area except in a non-display area positioned outside a sealant which bonds a TFT array substrate (first substrate) to the color filter substrate (second substrate).

In the related art, an overcoat layer may be coated on an entire surface of a substrate after a color filter layer is formed. The coated overcoat layer may be patterned by photolithography, to thereby form the overcoat layer on each color filter layer. Thus, the overcoat layer is formed on the substrate of a display area except in a non-display area positioned outside a sealant which bonds a TFT array substrate (first substrate) to a color filter substrate (second substrate). However, the related art necessarily requires a complicated photolithographic process. Thus, it is difficult to decrease manufacturing costs.

In the present invention, an overcoat layer is formed between a transforming layer and a printing layer. Thus, heat energy passes through the overcoat layer when forming the color filter layer. That is, the heat energy generated in the transforming layer is transmitted to the printing layer, thereby patterning the first, second and third overcoat layers 36a, 36b and 36c on each color filter layer. In the present invention, it is unnecessary to perform the complicated photolithography of the related art. Thus, manufacturing costs are decreased.

Subsequently, the substrate 30 including the first, second and third color filter layers 40, 42 and 44 and the first, second and third overcoat layers 36a, 36b and 36c may be cured at a temperature between 200° C. and 300° C. The color filter layers may be cured by condensation or radical action.

By using the curing process of the present invention, it is possible to cure the first, second and third overcoat layers 36a, 36b and 36c as well as the first, second and third color filter layers 40, 42 and 44. The first, second and third overcoat layers 36a, 36b and 36c serve as the passivation layers for the first, second and third color filter layers 40, 42 and 44.

A common electrode layer (not shown) may be formed on the first, second and third overcoat layers 36a, 36b and 36c by sputtering or E-beam.

Accordingly, the method of manufacturing the color filter substrate of the LCD device according to the present invention has the following advantages.

In the method of manufacturing the color filter substrate of the LCD device according to the present invention, the overcoat layer is formed between the transforming layer and the printing layer. Thus, heat energy generated in the transforming layer is transmitted to the printing layer through the overcoat layer, thereby patterning the first, second, and third overcoat layers. Thus, it is unnecessary to perform complicated photolithography and manufacturing costs are decreased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a color filter substrate of an LCD device comprising:
    forming black matrix layers at fixed intervals on a substrate except in first, second and third pixel regions;
    positioning a first printing film above the substrate, the first printing film including a first color filter printing layer, an overcoat layer, and a transforming layer; and
    forming a first color filter layer and a first overcoat layer in the first pixel region by applying light to the first printing film in a region corresponding to the first pixel region.

2. The method of claim 1, further comprising:
    positioning a second printing film above the substrate including the first color filter layer, the second printing film including a second color filter printing layer, an overcoat layer, and a transforming layer; and
    forming a second color filter layer and a second overcoat layer in the second pixel region by applying light to the second printing film in a region corresponding to the second pixel region.

3. The method of claim 2, further comprising:
    positioning a third printing film above the substrate including the second color filter layer, the third printing film including a third color filter printing layer, an overcoat layer, and a transforming layer; and forming a third color filter layer and a third overcoat layer in the third pixel region by applying light to the third printing film in a region corresponding to the third pixel region.

4. The method of claim 1, further comprising:

curing the substrate including the color filter layer and overcoat layer.

5. The method of claim 3, further comprising:

curing the substrate including the color filter layers and overcoat layers.

6. The method of claim 4, wherein the curing occurs at a temperature between 200° C. and 300° C.

7. The method of claim 5, wherein the curing occurs at a temperature between 200° C. and 300° C.

8. The method of claim 4, further comprising:

forming a common electrode layer on an entire surface of the substrate including the color filter layer and the overcoat layer after the curing process.

9. The method of claim 5, further comprising:

forming a common electrode layer on an entire surface of the substrate including the color filter layers and overcoat layers after the curing process.

10. The method of claim 1, wherein photolithography is used to form the black matrix layers.

11. The method of claim 3, wherein photolithography is used to form the black matrix layers.

12. The method of claim 1, wherein the black matrix layers are made of one of a chrome-based inorganic material and a carbon-based organic material.

13. The method of claim 1, wherein the first printing film further includes a supporting layer made of one of polyester, polyacrylate, epoxy resin, polyethylene, polypropylene, and polystyrene.

14. The method of claim 1, wherein the transforming layer is made of one of an organic compound of carbon black, carbon-graphitic pigment, and IR-pigment.

15. The method of claim 1, wherein the transforming layer is made of one of aluminum (Al), tin (Sn), titanium (Ti), aluminum (Al) oxide, tin (Sn) oxide, and titanium (Ti) oxide.

16. The method of claim 1, wherein the overcoat layer is made of an acrylic-based material including components that enhance printing properties.

17. A method of manufacturing a color filter substrate of an LCD device comprising:

forming black matrix layers on a substrate except in pixel regions;

positioning a printing film above the substrate, the printing film including a color filter printing layer, an overcoat layer, and a transforming layer; and patterning a corresponding color filter layer and a corresponding overcoat layer in each of the pixel regions by applying light to the printing film in a region corresponding to any one of the pixel regions.

18. The method of claim 17, further comprising:

curing the substrate including the patterned color filter layer and the patterned overcoat layer.

19. The method of claim 18, further comprising:

forming a common electrode layer on an entire surface of the substrate including the patterned color filter layer and the patterned overcoat layer after curing the substrate.

20. The method of claim 17, wherein photolithography is used to form the black matrix layers.

* * * * *